(12) United States Patent
Sejimo et al.

(10) Patent No.: US 9,461,569 B2
(45) Date of Patent: Oct. 4, 2016

(54) MOTOR CONTROL DEVICE, ROBOT HAND, ROBOT, AND MOTOR CONTROL METHOD

(71) Applicant: Seiko Epson Corporation, Tokyo (JP)

(72) Inventors: Isamu Sejimo, Chino (JP); Daisuke Sato, Chino (JP)

(73) Assignee: Seiko Epson Corporation (JP)

( * ) Notice: Subject to any disclaimer, the term of this patent is extended or adjusted under 35 U.S.C. 154(b) by 496 days.

(21) Appl. No.: 13/648,435

(22) Filed: Oct. 10, 2012

(65) Prior Publication Data

US 2013/0090761 A1    Apr. 11, 2013

(30) Foreign Application Priority Data

Oct. 11, 2011  (JP) .................................. 2011-223655

(51) Int. Cl.
*B25J 13/00* (2006.01)
*H02P 7/18* (2006.01)
*H02P 6/16* (2016.01)
(Continued)

(52) U.S. Cl.
CPC ................ *H02P 6/16* (2013.01); *B25J 9/1612* (2013.01); *B25J 13/00* (2013.01); *B25J 13/085* (2013.01); *B25J 13/088* (2013.01); *H02P 7/18* (2013.01); *H02P 21/13* (2013.01); *H02P 21/14* (2013.01); *H02P 23/0036* (2013.01); *H02P 27/06* (2013.01); *H02P 27/08* (2013.01)

(58) Field of Classification Search
CPC ........ H02P 21/13; H02P 21/14; H02P 27/06; H02P 27/08; H02P 23/0036; H02P 6/16; H02P 7/18; B25J 13/00; B25J 13/085; B25J 13/088; B25J 9/1612

USPC ........................................ 700/245; 901/2, 30
See application file for complete search history.

(56) References Cited

U.S. PATENT DOCUMENTS 6,356,807 B1 * 3/2002 McGee .................. B25J 9/1692
                                                              29/407.04
8,515,579 B2 * 8/2013 Alcazar et al. ............... 700/259
(Continued)

FOREIGN PATENT DOCUMENTS

JP      05-006210     1/1993
JP      10-138997 A   5/1998
(Continued)

OTHER PUBLICATIONS

Hirai, S., Tsuboi, T., & Wada, T. (May 2001). Robust grasping manipulation of deformable objects. In Proc. IEEE Symposium on Assembly and Task Planning (pp. 411-416).*

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

A motor control device controls a motor using an angle data signal and a rotational speed signal output from a rotation detector detecting a rotation state of a rotating shaft of the motor. The motor control device includes a speed control unit that outputs a torque instruction signal corresponding to a difference between the rotational speed of the rotating shaft and a speed instruction using the speed instruction of the rotating shaft and the rotational speed signal, a limit value setting unit that sets a torque limit value indicating the maximum value of the torque applied to the rotating shaft, and a torque limit control unit that limits the torque of the rotating shaft driven by the torque instruction signal to the torque limit value or less.

9 Claims, 9 Drawing Sheets

(51) Int. Cl.
*H02P 27/08* (2006.01)
*H02P 23/00* (2016.01)
*H02P 21/14* (2016.01)
*H02P 27/06* (2006.01)
*H02P 21/13* (2006.01)
*B25J 13/08* (2006.01)
*B25J 9/16* (2006.01)

(56) References Cited

U.S. PATENT DOCUMENTS

2004/0135533 A1* 7/2004 Harakawa ............... H02P 21/00
 318/609
2007/0252839 A1* 11/2007 Joly ....................... B25J 9/1664
 345/474
2010/0222970 A1* 9/2010 Shono ..................... B60L 15/20
 701/50
2011/0309781 A1* 12/2011 Tomigashi ............... H02P 21/13
 318/504

FOREIGN PATENT DOCUMENTS

| JP | 2003-284399 A | 10/2003 |
| JP | 2008-199760 A | 8/2008 |
| JP | 2010-005732 A | 1/2010 |
| JP | 2010-063306 A | 3/2010 |
| JP | 2011-147268 | 7/2011 |

* cited by examiner

MOTOR CONTROL DEVICE, ROBOT HAND, ROBOT, AND MOTOR CONTROL METHOD

BACKGROUND

1. Technical Field

The present invention relates to a motor control device, a robot hand, a robot, and a motor control method.

2. Related Art

A method of controlling a stop position of a movable part using a servomotor in a robot or a machine tool has been widely used. When a robot hand grasps a grasped object or inserts a member into a hole, the movable part may not move before the movable part reaches a prearranged position. At this time, a system for setting a torque limit in a motor and controlling a movable part is disclosed in JP-A-5-6210. According to this technique, the control system includes a storage unit storing plural torque limit values and switches the torque limit values for every work detail carried out by a motor or a movable part to be driven.

A method of improving the controllability of a rotational speed without rapidly changing a torque during the rotational driving of a motor is disclosed in JP-A-2011-147268. According to this technique, in a speed control of the motor, a deviation between an instructed speed value and a detected speed value is amplified by the use of a speed regulator including a proportion-integration adjuster to calculate an instructed torque value. A method of controlling the current of the motor so as to match the actual torque with the instructed torque value is employed. Here, the optimal adjustment of the speed regulator is performed on the basis of the value of the moment of inertia. A torque feed-forward compensator calculates a torque feed-forward compensator using the value of the moment of inertia and the instructed speed value. An adder adds the output of the speed regulator and the torque feed-forward compensation value to calculate the instructed torque value. When a robot hand grasps a grasped object, first, a control device causes a movable part of a robot hand to approach and then contact the grasped object. Subsequently, a state where the movable part presses the grasped object is maintained. When causing the movable part to approach the grasped object, the control device controls the speed of the motor. After the movable part contacts the grasped object, the control device switches the control of the motor to a torque control. The torque of the motor is controlled so that the movable part can press the grasped object with a force with which the grasped object can be grasped. At this time, the control device can cause the movable part to grasp the grasped object by freely controlling the torque of the motor depending on the situation while controlling the motor.

When the control of the motor is switched from the speed control to the torque control, a method of switching a control circuit performing the speed control to a control circuit performing the torque control has been used up to now. Here, in order to switch the control system, it is necessary to temporarily stop the movement of the movable part. Accordingly, there is a need for a method of causing the robot hand to grasp a grasped object without temporarily stopping. That is, there is a need for a control device of a motor of which the rotating shaft rotates with a torque not greater than a set torque limit value while controlling the speed even when the rotating shaft is rotating and when the rotating shaft is stopped.

SUMMARY

An advantage of some aspects of the invention is to solve at least a part of the problems described above, and the invention can be implemented as the following forms or application examples.

An application example of the invention is directed to a motor control device that controls a motor using a rotation detection signal of a rotating shaft of the motor output from a rotation detector detecting a rotation state of the rotating shaft of the motor, including: a speed controller that outputs a torque instruction signal corresponding to a difference between a rotational speed of the rotating shaft and a target rotational speed of the rotating shaft using the target rotational speed of the rotating shaft and the rotation detection signal; a limit value setting unit that sets a torque limit value indicating the maximum value of a torque to be applied to the rotating shaft; and a torque limit control unit that limits the torque of the rotating shaft driven by the torque instruction signal to the torque limit value or less.

According to this application example of the invention, the motor includes the rotation detector. The rotation detector detects the rotation state of the rotating shaft of the motor and outputs the rotation detection signal. The speed control unit receives the rotation detection signal and compares the rotational speed indicated by the rotation detection signal with the target rotational speed of the rotating shaft. The speed control unit performs a speed control of comparing the rotational speed indicated by the rotation detection signal with the target rotational speed and outputting the torque instruction signal. The speed control unit outputs the torque instruction signal so as to apply a larger torque to the rotating shaft the larger the difference between the target rotational speed and the rotational speed indicated by the rotation detection signal becomes.

The limit value setting unit sets the torque limit value which is the maximum value of the torque to be applied to the rotating shaft and outputs the set torque limit value to the torque limit control unit. The torque limit control unit compares the torque of the rotating shaft driven by the torque instruction signal with the torque limit value. When the torque of the rotating shaft driven by the torque instruction signal is greater than the torque limit value, the torque limit control unit changes the torque instruction signal so that the torque of the rotating shaft driven by the torque instruction signal is not larger than the torque limit value.

Therefore, even when the rotating shaft is rotating and when the rotating shaft is stopped, the rotating shaft rotates with a torque not larger than the torque limit value set by the limit value setting unit while performing the speed control. As a result, it is possible to control the speed of the rotating shaft with a torque corresponding to the torque required for the motor.

In the motor control device according to the above-mentioned application example, the torque limit control unit may subtract an excess torque signal, which is a signal indicating a magnitude by which the torque applied to the rotating shaft by the torque instruction signal is larger than the torque limit value, from the torque instruction signal.

According to this application example, when the torque applied to the rotating shaft by the torque instruction signal is larger than the torque limit value, the torque limit control unit subtracts the excess torque signal from the torque instruction signal to change the torque instruction signal. The excess torque signal is a signal indicating that the torque applied to the rotating shaft by the torque instruction signal is larger than the torque limit value. Accordingly, it is possible to control the rotating shaft so that the torque of the rotating shaft driven by the subtracted torque instruction signal is not larger than the torque limit value.

In the motor control device according to the above-mentioned application example, the limit value setting unit may set a speed determination value used to determine whether to change the torque limit value, the limit value setting unit may detect the rotational speed of the rotating shaft using the rotation detection signal, and the limit value setting unit may change the torque limit value when the rotational speed of the rotating speed is lower than the speed determination value.

According to this application example, the limit value setting unit receives the rotation detection signal. When the rotational speed of the rotating shaft is lower than the speed determination value, the limit value setting unit changes the torque limit value. Accordingly, the motor control device can drive the rotating shaft with a torque corresponding to the torque limit value in a state where the rotating shaft rotates at a low speed or is stopped.

In the motor control device according to the above-mentioned application example, the limit value setting unit may set a speed determination value used to determine whether to change the torque limit value, the limit value setting unit may receive the torque instruction signal, and the limit value setting unit may change the torque limit value when the target rotational speed is smaller than the speed determination value and the torque instruction signal is larger than a torque determination value.

According to this application example, the limit value setting unit receives the torque instruction signal. As the rotational speed of the rotating shaft becomes lower than the target rotational speed and the difference therebetween becomes larger, the torque instruction signal is output as a signal for increasing the torque of the rotating shaft. That is, the limit value setting unit can detect that the rotating shaft rotates at a low speed or is stopped using the torque instruction signal. Then, the limit value setting unit changes the torque limit value when the rotational speed is lower than the speed determination value. Therefore, the motor control device can drive the rotating shaft with a torque corresponding to the torque limit value in a state where the rotating shaft rotates at a low speed or is stopped.

In the motor control device according to the above-mentioned application example, the limit value setting unit may lower the torque limit value after the rotational speed of the rotating shaft reaches the target rotational speed.

According to this application example, the rotating shaft is accelerated and the rotational speed is raised. After the rotational speed of the rotating shaft reaches the target rotational speed, the limit value setting unit lowers the torque limit value. Since a torque necessary for maintaining the rotational speed is applied after the rotational speed reaches the target rotational speed, this torque is lower than that in the case where the rotating shaft is accelerated.

Therefore, it is possible to maintain the rotational speed even when the torque limit value is lowered. As a result, the motor control device can perform an operation corresponding to an external force without driving the rotating shaft against the external force when the external force for stopping the rotating shaft is applied thereto.

In the motor control device according to the above-mentioned application example, the speed control unit may include: a speed-proportional control unit that outputs a first torque instruction signal proportional to the rotational speed; a speed-integral control unit that outputs a second torque instruction signal proportional to an integrated value of the rotational speed; and an adder that adds the value of the first torque instruction signal and the value of the second torque instruction signal to output the torque instruction signal, and the torque limit control unit may cause the speed-integral control unit to stop an integrating operation and to maintain the value of the second torque instruction signal after the value of the torque instruction signal reaches the torque limit value.

According to this application example, the speed control unit includes the speed-proportional control unit, the speed-integral control unit, and the adder. The speed-proportional control unit outputs the first torque instruction signal proportional to the rotational speed and the speed-integral control unit outputs the second torque instruction signal proportional to the integrated value of the rotational speed. The adder adds the first torque instruction signal and the second torque instruction signal and outputs the torque instruction signal. That is, since the speed control unit performs a PI (Proportional-Integral) control, it is possible to control the motor with high precision. When the torque instruction signal becomes the torque limit value, the torque limit control unit causes the speed-integral control unit to stop the integrating operation. Accordingly, it is possible to prevent the second torque instruction signal from increasing. As a result, when the torque instruction signal is smaller than the torque limit value, it is possible to perform a control so as to follow the rotational speed.

In the motor control device according to the above-mentioned application example, the rotation state of the rotating shaft detected by the rotation detector may be a rotational speed. According to this application example, the rotational detector detects the rotational speed. Accordingly, it is possible to easily perform a torque control corresponding to the rotational speed of the rotating shaft.

Another application example of the invention is directed to a robot hand including: a movable part; a motor that drives the movable part; and a control unit that controls the motor, wherein the control unit includes the above-mentioned motor control device that controls the motor.

According to this application example, the robot hand includes the movable part and the motor. The movable part moves by rotating the rotating shaft of the motor. The robot hand includes the control unit. The control unit includes the motor control unit and the motor control unit controls the rotational angle or the rotating speed of the motor. The control unit controls the action of the movable part by controlling a driving unit.

The motor control unit includes the above-mentioned motor control device. Therefore, it is possible to drive the rotating shaft with a torque corresponding to the torque required for the motor even when the rotating shaft rotates and when the rotating shaft is stopped. As a result, it is possible to maintain a predetermined force and to drive the movable part even when the movable part moves and then stops.

In the robot hand according to the above-mentioned application example, the movable part may include a first movable part and a second movable part between which a grasped object is pinched, and the control unit may perform a control operation of moving the first movable part and the second movable part so that the gap between the first movable part and the second movable part is smaller than the width of the grasped object.

According to this application example, the robot hand includes the first movable part and the second movable part. These movable parts can pinch a grasped object therebetween. The control unit controls the movable parts so that the gap between the first movable part and the second movable part is smaller than the width of the grasped object. Accordingly, when a grasped object is present between the first movable part and the second movable part, the first movable part and the second movable part pinch the grasped object therebetween. After the movable parts pinch the grasped object, the torque of the rotating shaft can be raised without being lowered. Therefore, the action of pinching the grasped object can be performed subsequently to the action of moving the movable parts. In order to cause the movable parts to approach a grasped object, the motor control unit raises the torque of the rotating shaft to the torque limit value. At this time, since the torque of the rotating shaft can be slowly raised, it is possible to prevent a force from being rapidly applied to the grasped object to damage the grasped object. When the grasped object departs from the space between the first movable part and the second movable part, the first movable part and the second movable part are stopped at positions at which the gap between the first movable part and the second movable part is smaller than the width of the grasped object. Therefore, it is possible to prevent the first movable part and the second movable part from colliding with each other.

Still another application example of the invention is directed to a robot employing the above-mentioned robot hand.

According to this application example, the robot includes the above-mentioned robot hand. Therefore, the robot hand of the robot can maintain a predetermined force and drive the movable part even when the movable part moves and then stops.

Yet another application example of the invention is directed to a motor control method of controlling the rotation of a rotating shaft of a motor, including: setting a target rotational speed which is a target value of a rotational speed at which the rotating shaft rotates and a torque limit value which indicates the maximum value of a torque to be applied to the rotating shaft; detecting the rotational speed to output a torque instruction signal corresponding to a difference between the rotational speed and the target rotational speed; and subtracting an excess torque signal, which is a signal indicating a magnitude by which the torque applied to the rotating shaft by the torque instruction signal is larger than the torque limit value, from the torque instruction signal and driving the motor with a torque of the subtracted torque instruction signal.

According to this application example of the invention, the target rotational speed and the torque limit value are set. The rotational speed is detected and the torque instruction signal corresponding to the difference between the rotational speed and the target rotational speed is output. That is, the larger the difference between the rotational speed and the target rotational speed becomes, a torque instruction signal for outputting the larger torque is output. Accordingly, the rotational speed is controlled to reach the target rotational speed.

The excess torque signal is subtracted from the torque instruction signal. Accordingly, the torque instruction signal is changed so that the torque of the rotating shaft driven by the torque instruction signal is not larger than the torque limit value. Therefore, the rotating shaft is controlled to move with a torque not larger than the torque limit value while performing the speed control even when the rotating shaft rotates and when the rotating shaft stops. As a result, it is possible to control the speed of the rotating shaft with a torque not larger than the torque limit value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
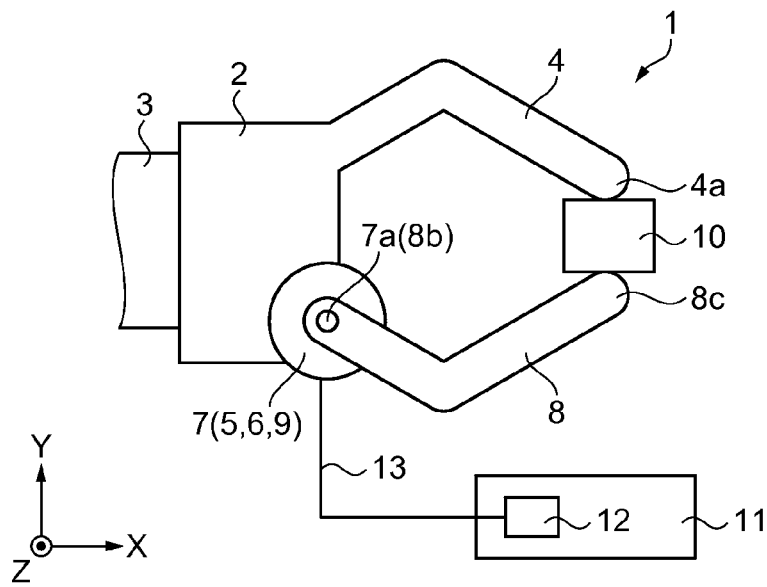
FIG. 1A is a plan view schematically illustrating the configuration of a robot hand according to a first embodiment of the invention.

Hereinafter, embodiments of the invention will be described with reference to the accompanying drawings. Here, constituents in the drawings are drawn with different scales so as to be recognizable in the drawings.

First Embodiment

In this embodiment, features of a motor control device and a robot hand using the motor control device will be described with reference to FIGS. 1A to 6.

Robot Hand

Figure 1B:
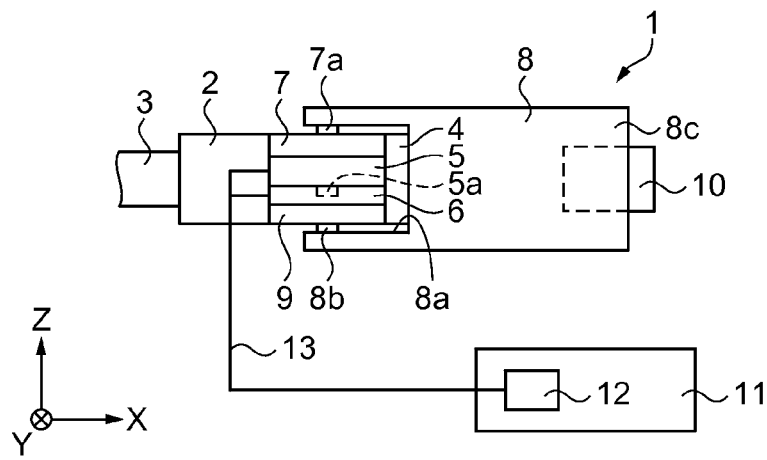
FIG. 1B is a side view schematically illustrating the configuration of the robot hand.

FIG. 1A is a plan view schematically illustrating the configuration of a robot hand and FIG. 1B is a side view schematically illustrating the configuration of a robot hand.

Figure 1C:
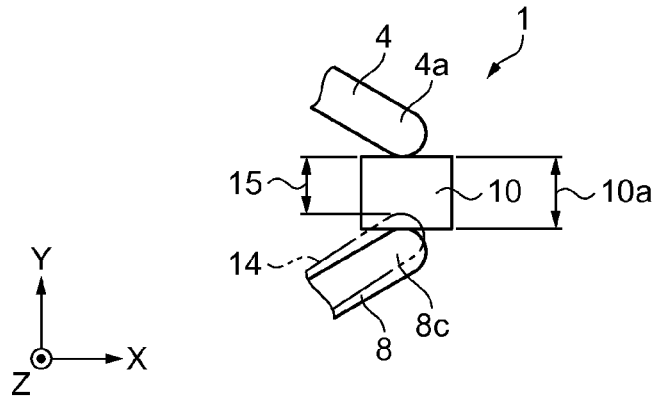
FIG. 1C is a partially-enlarged view schematically illustrating fingers of the robot hand.

FIG. 1C is a partially-enlarged view schematically illustrating fingers of the robot hand. As shown in FIGS. 1A and 1B, the robot hand 1 includes a hand body 2 of a rectangular parallelepiped shape. The longitudinal direction of the hand body 2 is defined as a Y direction and a direction perpendicular to the Y direction is defined as an X direction. The thickness direction of the hand body 2 perpendicular to the X direction and the Y direction is defined as a Z direction.

On the -X side of the hand body 2, the hand body 2 is connected to an arm 3 and the arm 3 is connected to a robot body not shown in the drawing. A fixed finger 4 extending in the X direction is disposed at the corner in the X direction and the Y direction of the hand body 2. The fixed finger 4 has a prism shape which is bent at the center thereof. The tip 4a of the fixed finger 4 has an arch shape in an XY plane.

A motor 5 is disposed at the corner in the X direction and the Y direction of the hand body 2. The rotating shaft 5a of the motor 5 protrudes in the Z direction and the -Z direction of the motor 5. An encoder 6 is disposed in the -Z direction of the motor 5 and the encoder 6 outputs a signal corresponding to the rotation angle of the rotating shaft 5a.

A reduction gear 7 is disposed in the Z direction of the motor 5. An end of the rotating shaft 5a is inserted into the reduction gear 7. An output shaft 7a is disposed in the Z direction of the reduction gear 7 and the reduction gear 7 rotates the output shaft 7a at a rotational speed lower than the rotational speed of the rotating shaft 5a. The output shaft 7a is connected to a movable finger 8 as the movable part and the first movable part.

The movable finger 8 includes a concave portion 8a, and the motor 5, the encoder 6, and the reduction gear 7 are located in the concave portion 8a. A rotating shaft 8b rotating about the same axis as the central axis of the output shaft 7a is disposed in the concave portion 8a. A bearing 9 receiving the rotating shaft 8b is disposed in the -Z direction of the encoder 6. Accordingly, the movable finger 8 is disposed to be rotatable relative to the hand body 2. The movable finger 8 rotates about the output shaft 7a and the rotating shaft 8b when the motor 5 rotates.

The movable finger 8 has a prism shape which is bent at the center thereof, similarly to the fixed finger 4. The tip 8c of the movable finger 8 has an arc shape in the XY plane, similarly to the tip 4a. When the motor 5 rotates the movable finger 8, the tip 8c comes in contact with the tip 4a. The rotating shaft 5a is rotated so that the tip 8c comes in contact with the tip 4a with a grasped object 10 interposed between the tip 4a and the tip 8c. At this time, the robot hand 1 can grasp the grasped object 10 by pressing the tip 4a and the tip 8c on the grasped object 10.

The robot hand 1 includes a control device 11. A motor control device 12 controlling the rotation and stop of the motor 5 is connected to the control device 11 via a wire 13. The control device 11 causes the motor control device 12 to drive the motor 5 so as to open and close the movable finger 8.

As shown in FIG. 1C, the robot hand 1 grasps the grasped object 10 by pinching the grasped object between the fixed finger 4 and the movable finger 8. The width of the grasped object 10 in the direction passing through the positions at which the fixed finger 4 and the movable finger 8 come in contact with the grasped object 10 is defined as a grasped object width 10a.

A movement destination 14 of the movable finger 8 is indicated by a two-dot chained line in the drawing. The control device 11 causes the motor control device 12 to drive the motor 5 so that the movable finger 8 moves to the movement destination 14.

The gap between the fixed finger 4 and the movement destination 14 is defined as a target gap 15. Here, the target gap 15 is smaller than the grasped object width 10a. Accordingly, the movable finger 8 comes in contact with the grasped object 10 before it reaches the movement destination 14. Accordingly, the grasped object 10 can be pressed and grasped with the fixed finger 4 and the movable finger 8 until the control device 11 changes the instruction of the motor control device 12 to drive the motor 5.

Motor Control Device

Figure 2:
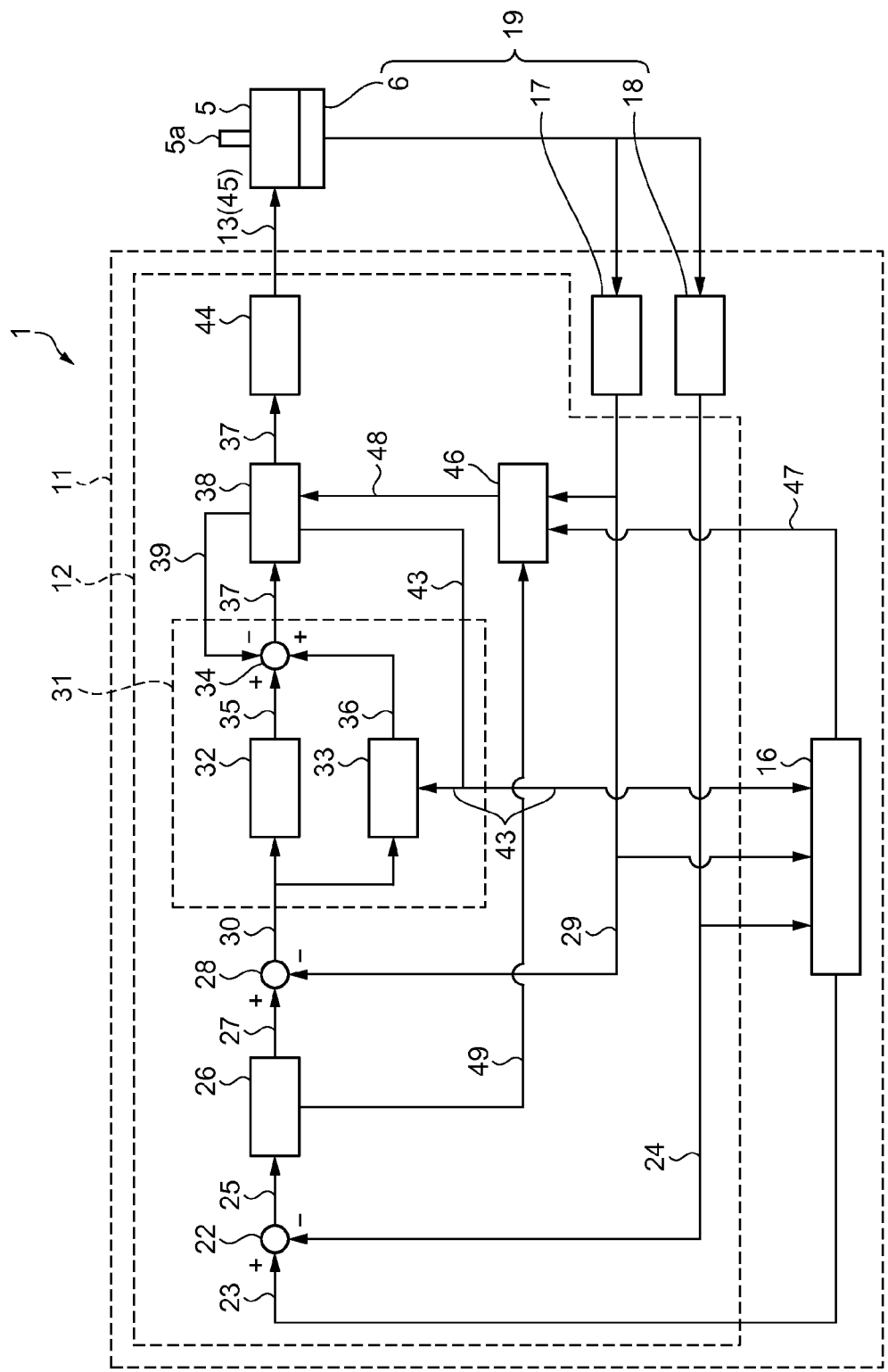
FIG. 2 is a block diagram illustrating the configuration of a control device.

FIG. 2 is a block diagram illustrating the configuration of the control device. As shown in FIG. 2, the control device 11 includes a unified control unit 16, a speed detecting unit 17, and an angle detecting unit 18 in addition to the motor control device 12. The general control unit 16 has a function of controlling other motors in addition to the motor 5 of the robot hand 1. The unified control unit 16 unifies and manages movable parts driven by the motors. The speed detecting unit 17 has a function of receiving a signal output from the encoder 6 and detecting the rotational speed of the rotating shaft 5a.

A pulse signal corresponding to the rotation angle of the rotating shaft 5a is output from the encoder 6. The resolution of the encoder 6 is not particularly limited, and a pulse signal is output whenever the rotating shaft 5a rotates by 0.1 degrees in this embodiment. The speed detecting unit 17 detects the rotational speed of the rotating shaft 5a by measuring the time interval of the pulse signals.

The angle detecting unit 18 has a function of receiving the signal output from the encoder 6 and detecting the rotation angle of the rotating shaft 5a. The angle detecting unit 18 detects the rotation angle of the rotating shaft 5a by measuring the number of input pulse signals. The encoder 6, the speed detecting unit 17, and the angle detecting unit 18 constitute a rotation detector 19.

The motor control device 12 includes a first adder 22. The unified control unit 16 outputs an angle instruction 23 indicating a target rotation angle of the motor 5 to the first adder 22. The angle instruction 23 indicates the rotation angle of the rotating shaft 5a when the movable finger 8 reaches the movement destination 14. The angle detecting unit 18 outputs an angle data signal 24 indicating the angle of the rotating shaft 5a to the first adder 22. The first adder 22 calculates an operation angle signal 25 obtained by subtracting the angle data signal 24 from the angle instruction 23. Then, the first adder outputs the operation angle signal 25 which is an angle for rotating the rotating shaft 5a until the movable finger 8 reaches the movement destination 14.

A position control unit 26 is connected to the first adder 22 and the operation angle signal 25 is input to the position control unit 26. The position control unit 26 calculates and outputs a speed instruction 27 using the operation angle signal 25. The position control unit 26 compares the rotation angle of the rotating shaft 5a indicated by the operation angle signal 25 with a determination angle. When the rotation angle is greater than the determination angle, the position control unit 26 sets the speed instruction 27 to the maximum speed and outputs the set speed instruction 27. When the rotation angle is smaller than the determination angle, the position control unit 26 sets the speed instruction 27 to a speed corresponding to the rotation angle and outputs the set speed instruction 27. That is, the position control unit 26 outputs the speed instruction 27 for rotating the rotating shaft at a high speed when the rotation angle is large, and outputs the speed instruction 27 for rotating the rotating shaft at a low speed when the rotation angle is small. The speed instruction 27 indicates the target rotational speed of the rotating shaft 5a.

A second adder 28 is connected to the position control unit 26. The speed instruction 27 is input to the second adder 28.

The speed detecting unit 17 is connected to the second adder 28 and a rotational speed signal 29 as the rotation detection signal output from the speed detecting unit 17 is input to the second adder 28. The rotational speed signal 29 is data of the rotational speed of the rotating shaft 5a detected by the encoder 6 and the speed detecting unit 17.

The second adder 28 subtracts the rotational speed indicated by the rotational speed signal 29 from the speed instruction 27 and outputs a speed difference signal 30. The speed difference signal 30 is a difference in rotational speed between the speed instruction 27 and the rotational speed of the rotating shaft 5a. When the rotating shaft 5a rotates in the rotation direction indicated by the speed instruction 27 and the speed instruction 27 is larger than the rotational speed of the rotating shaft 5a, the speed difference signal 30 has a positive value. When the rotational speed of the rotating shaft 5a is smaller than the speed instruction 27, the speed difference signal 30 has a negative value.

A speed control unit 31 is connected to the second adder 28. The speed control unit 31 includes a proportional control unit 32, an integral control unit 33, and a third adder 34. The proportional control unit 32 and the integral control unit 33 are connected to the second adder 28 and is also connected to the third adder 34. The speed difference signal 30 is input to the proportional control unit 32 from the second adder 28.

The proportional control unit 32 calculates a first torque signal 35 by multiplying the speed difference signal 30 by a predetermined constant and outputs the first torque signal to the third adder 34. The speed difference signal 30 is input to the integral control unit 33 from the second adder 28. The integral control unit 33 calculates a second torque signal 36 as the second torque instruction signal by multiplying a value, which is obtained by integrating the speed difference signal 30 with respect to the time axis, by a predetermined constant and outputs the second torque signal to the third adder 34.

The third adder 34 adds the first torque signal 35 and the second torque signal 36 and outputs a torque instruction signal 37. The second adder 28 and the speed control unit 31 perform a PI (Proportional Integral) control so that the rotational speed signal 29 gets close to the speed instruction 27. That is, the proportional control unit 32 brings the rotational speed signal 29 close to the speed instruction 27 by outputting the first torque signal 35 proportional to the speed difference signal 30. The integral control unit 33 controls the motor 5 so as to cancel the offset generated when the rotating shaft 5a is driven by the first torque signal 35.

A torque limit control unit 38 is connected to the third adder 34. The torque instruction signal 37 is input to the torque limit control unit 38. The torque limit control unit 38 stores a torque limit value. The torque limit control unit 38 compares the torque limit value with the torque instruction signal 37.

When the torque instruction signal 37 is greater than the torque limit value, the torque limit control unit 38 outputs a feedback torque signal 39 as the excess torque signal corresponding to the amount obtained by subtracting the torque limit value from the torque instruction signal 37 to the third adder 34. The third adder 34 adds the first torque signal 35 and the second torque signal 36 and subtracts the feedback torque signal 39 from the added value to generate the torque instruction signal 37. Therefore, the torque instruction signal 37 is not greater than the torque limit value.

The torque limit control unit 38 outputs an integration stop signal 43 to the integral control unit 33. The integral control unit 33 stops the operation of integrating the speed difference signal 30 when the integration stop signal 43 is input. The integral control unit 33 does not increase but maintains the second torques signal 36. When the speed difference signal 30 is output but the rotating shaft 5a cannot rotate, the integral control unit 33 maintains the second torque signal 36. Accordingly, when the rotating shaft 5a rotates again, the unified control unit 16 can cause the motor control device 12 to normally perform the PI control.

A motor driving unit 44 is connected to the torque limit control unit 38. The motor driving unit 44 receives the torque instruction signal 37 from the torque limit control unit 38 and outputs a drive signal 45 to the motor 5. The motor driving unit 44 includes a power transistor or the like and thus the drive signal 45 output from the motor driving unit 44 has power enough to drive the motor 5.

A limit value setting unit 46 is connected to the unified control unit 16, the speed detecting unit 17, and the torque limit control unit 38. The unified control unit 16 outputs a torque limit signal 47 including the torque limit value corresponding to the state of the rotating shaft 5a to the limit value setting unit 46. The limit value setting unit 46 includes a storage unit such as a memory and stores data of the torque limit value corresponding to the state of the rotating shaft 5a. Examples of the state of the rotating shaft 5a include states of accelerated rotation, constant-speed rotation at a high speed, decelerated rotation, and stop.

The limit value setting unit 46 receives the rotational speed signal 29 from the speed detecting unit 17. The limit value setting unit 46 determines the rotation state of the rotating shaft 5a and outputs a limit torque setting signal 48 corresponding to the rotation state of the rotating shaft 5a to the torque limit control unit 38. The torque limit control unit 38 receives the limit torque setting signal 48 and sets the torque limit value.

The position control unit 26 recognizes to which of the accelerated rotation and the decelerated rotation the speed instruction 27 corresponds when calculating the speed instruction 27. When the mode is switched, the position control unit 26 outputs a mode signal 49 indicating to which of the accelerated rotation and the decelerated rotation the mode is switched to the limit value setting unit 46. The limit value setting unit 46 can set the torque limit value to correspond to the mode switched by the position control unit 26.

The unified control unit 16 receives the angle data signal 24, the rotational speed signal 29, and the integration stop signal 43. Accordingly, the unified control unit 16 recognizes whether the rotating shaft 5a rotates or stops. When the rotating shaft 5a rotates, the unified control unit 16 can recognize the rotation angle or the rotational speed of the rotating shaft 5a. The unified control unit 16 receives the integration stop signal 43 from the torque limit control unit 38. The unified control unit 16 can recognize whether the torque instruction signal 37 reaches the torque limit value using the integration stop signal 43.

Figure 3:
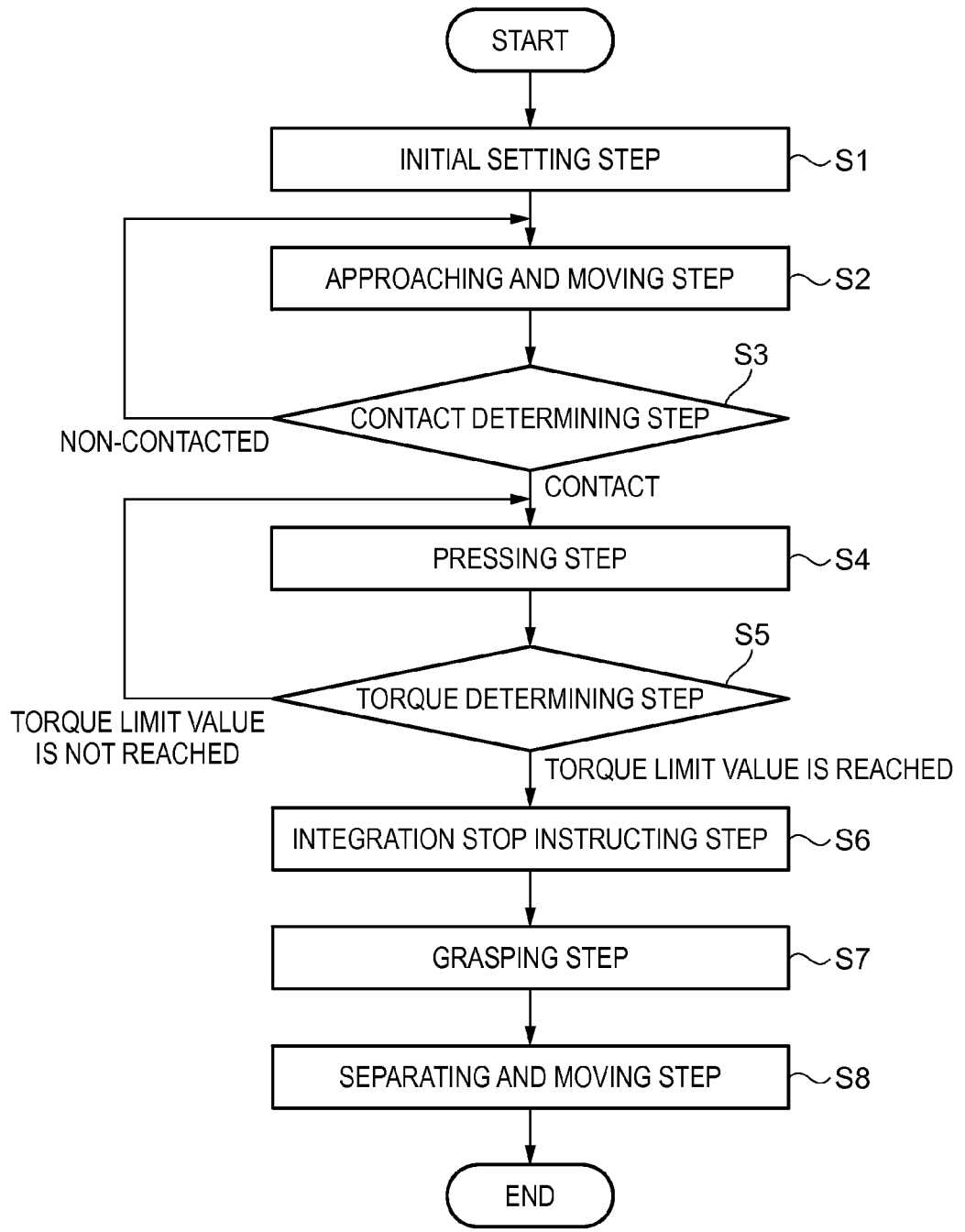
FIG. 3 is a flowchart illustrating a grasping operation of the robot hand.
Figure 4:
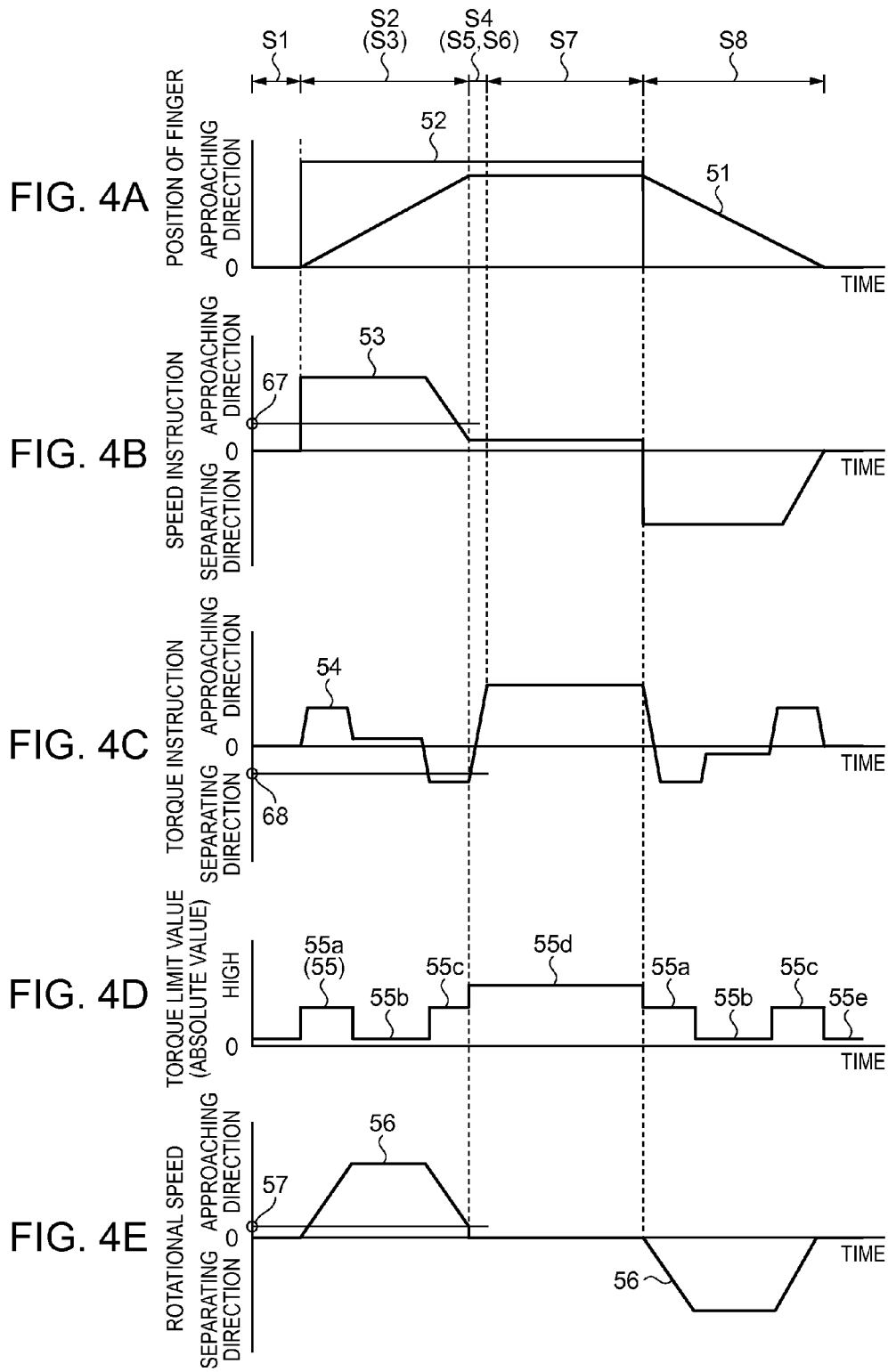
FIGS. 4A to 4E are timing diagrams illustrating a grasping method in the grasping operation.

A method of grasping a grasped object 10 using the above-mentioned robot hand 1 will be described below with reference to FIGS. 3 to 6. FIG. 3 is a flowchart illustrating a grasping operation of the robot hand. FIGS. 4A to 6B are timing diagrams illustrating a grasping method in the grasping operation.

Motor Driving Method

In the flowchart shown in FIG. 3, step S1 corresponds to an initial setting step. This step is a step of setting a motor to an initial value. Then, the flow of processes goes to step S2. Step S2 corresponds to an approaching and moving step. This step is a step of moving the movable finger to get closer to a grasped object. Then, the flow of processes goes to step S3. Step S3 corresponds to a contact determining step. This step is a step of determining whether the movable finger comes in contact with the grasped object. When it is determined that the movable finger does not come in contact with the grasped object, the flow of processes goes to step S2. When it is determined that the movable finger comes in contact with the grasped object, the flow of processes goes to step S4. Step S4 corresponds to a pressing step. This step is a step of causing the movable finger to press the grasped object. Then, the flow of processes goes to step S5.

Step S5 corresponds to a torque determining step. This step is a step of determining whether the torque instruction signal reaches the torque limit value. When the torque instruction signal does not reach the torque limit value, the flow of processes goes to step S4. When the torque instruction signal reaches the torque limit value, the flow of processes goes to step S6. Step S6 corresponds to a integration stop instructing step. This step is a step of causing the torque limit control unit to output the integration stop signal to the integral control unit so that the integral control unit stops the integrating operation. Then, the flow of processes goes to step S7. Step S7 corresponds to a grasping step. This step is a step of maintaining the state where the movable finger presses the grasped object. Then, the flow of process goes to step S8. Step S8 corresponds to a separating and moving step. This step is a step of causing the movable finger to move in a direction in which the movable finger is separated away from the grasped object. Through the above-mentioned steps, the grasping operation of the robot hand is ended.

The control of the motor in the grasping operation of the robot hand will be described in detail below with reference to FIGS. 4A to 6B in correspondence with the steps shown in FIG. 3. The timing diagrams shown in FIGS. 4A to 4E include five timing diagrams FIGS. 4A to 4E. In the timing diagrams, the horizontal axis represents the change of time and changes in the order of steps S1 to S8.

The vertical axis of the timing diagram shown in FIG. 4A represents the position of the finger and the upper part in the drawing represents the direction in which the finger approaches a grasped object. A finger change line 51 represents the position of the tip 8c of the movable finger 8. Since the rotating shaft 8b of the movable finger 8 is connected to the rotating shaft 5a of the motor 5 with the reduction gear 7 interposed therebetween, the finger change line 51 is substantially equal to the change of the rotation angle of the rotating shaft 5a. A target finger change line 52 represents the movement destination of the tip 8c instructed by the unified control unit 16. Therefore, the finger change line 51 is controlled to move to the position indicated by the target finger change line 52.

The vertical axis of the timing diagram shown in FIG. 4B represents the speed instruction for driving the rotating shaft of the motor. The part above the line in which the speed is 0 in the drawing represents the speed when the rotating shaft 5a rotates to bring the movable finger 8 close to the grasped object 10, and the upper part is higher in speed than the lower part. The part below the line in which the speed is 0 in the drawing represents the speed when the rotating shaft 5a rotates to separate the movable finger 8 away from the grasped object 10, and the lower part is higher in speed than the upper part.

A speed instruction change line 53 represents the change of the speed instruction 27 output from the position control unit 26. The speed instruction 27 is a signal indicating the target rotational speed of the rotating shaft 5a.

The vertical axis of the timing diagram shown in FIG. 4C represents the torque instruction for driving the rotating shaft. The part above the line in which the torque is 0 in the drawing represents the torque when the rotating shaft 5a rotates to bring the movable finger 8 close to the grasped object 10, and the upper part is higher in torque than the lower part. The part below the line in which the torque is 0 in the drawing represents the torque when the rotating shaft 5a rotates to separate the movable finger 8 away from the grasped object 10, and the lower part is higher in torque than the upper part. A torque instruction change line 54 represents the change of the torque instruction signal 37 output to the motor driving unit 44 from the torque limit control unit 38.

The vertical axis of the timing diagram shown in FIG. 4D represents the torque limit value of the torque for driving the rotating shaft. In the drawing, the upper part is higher in torque than the lower part. A torque limit value change line 55 represents the change of the limit torque setting signal 48 output to the torque limit control unit 38 from the limit value setting unit 46.

The vertical axis of the timing diagram shown in FIG. 4E represents the rotational speed of the rotating shaft. The part above the line in which the speed is 0 in the drawing represents the speed when the rotating shaft 5a rotates to bring the movable finger 8 close to the grasped object 10, and the upper part is higher in speed than the lower part. The part below the line in which the speed is 0 in the drawing represents the speed when the rotating shaft 5a rotates to separate the movable finger 8 away from the grasped object 10, in which the lower part is higher in speed than the upper part. A rotational speed change line 56 represents the change of the rotational speed of the rotating shaft 5a. The contact determination speed 57 as the speed determination value represents the speed used to determine whether the movable finger 8 comes in contact with the grasped object 10.

In FIGS. 4A to 4E, in the initial setting step of step S1, the unified control unit 16 sets parameters used for the control to initial values. That is, preparation for operating the movable finger 8 is carried out. For example, the unified control unit 16 prepares for outputting the angle instruction 23 or the torque limit value.

In the approaching and moving step of step S2, the unified control unit 16 outputs an instruction to the motor control device 12 to move the movable finger 8 to the movement destination 14. Accordingly, the target finger change line 52 moves toward the grasped object 10. Specifically, the unified control unit 16 outputs the angle instruction 23 to the first adder 22. Accordingly, since a difference is caused between the angle data signal 24 output from the angle detecting unit 18 and the angle instruction 23, the first adder 22 outputs the operation angle signal 25 corresponding to the change of the target finger change line 52 to the position control unit 26.

The position control unit 26 calculates the speed instruction 27 corresponding to the operation angle signal 25 and outputs the calculated speed instruction to the second adder 28.

Accordingly, as can be seen from the speed instruction change line 53, the speed instruction 27 is set to a high speed. The second adder 28 outputs the speed difference signal 30 corresponding to the difference between the speed instruction 27 and the rotational speed signal 29 to the speed control unit 31. Since the speed difference signal 30 is a signal indicating a large speed difference, the speed control unit 31 outputs the high torque instruction signal 37 to the torque limit control unit 38, as can be seen from the torque instruction change line 54.

The position control unit 26 outputs a mode signal 49 indicating the accelerated rotation state to the limit value setting unit 46. The limit value setting unit 46 receives the mode signal 49 and outputs the limit torque setting signal 48 to the torque limit control unit 38. As can be seen from the torque limit value change line 55, the torque limit control unit 38 raises the torque limit value to an accelerating limit value 55a. The acceleration time requires acceleration and thus the torque limit value is set to be high. Accordingly, as can be seen from the torque instruction change line 54, the torque instruction signal 37 of a high torque is output to the motor driving unit 44. The motor driving unit 44 drives the motor 5 to correspond to the torque instruction signal 37. As a result, as can be seen from the rotational speed change line 56, the rotational speed of the rotating shaft 5a increases. When the rotational speed of the rotating shaft 5a increases, the difference between the speed instruction 27 and the rotational speed signal 29 decreases and thus the speed difference signal 30 decreases accordingly. Accordingly, as can be seen from the torque instruction change line 54, the speed control unit 31 decreases the torque instruction signal 37. As can be seen from the rotational speed change line 56, the rotating shaft 8b is changed from the accelerated rotation to the constant-speed rotation. The unified control unit 16 determines the change to the constant-speed rotation and outputs the torque limit signal 47 indicating the change to the constant-speed rotation mode to the limit value setting unit 46. The limit value setting unit 46 receives the torque limit signal 47 and recognizes the change to the constant-speed rotation. As can be seen from the torque limit value change line 55, the limit value setting unit 46 lowers the torque limit value to a constant-speed-rotating limit value 55b. In the constant-speed rotation mode, since the movable finger 8 moves through inertia, the rotating shaft rotates even with a small torque. Accordingly, the rotating shaft 5a is driven with a small torque even when the rotational speed is changed. When the movable finger 8 comes in contact with an unexpected object, the motor 5 is not accelerated and thus a large torque does not act on the movable finger 8. Accordingly, since the movable finger 8 moves with an acting external force, it is possible to suppress the damage of the movable finger 8.

When the movable finger 8 approaches the movement destination 14, the position control unit 26 switches the speed instruction 27 to a low speed, as can be seen from the speed instruction change line 53. Accordingly, since the speed instruction 27 is a rotational speed lower than the rotational speed signal 29, the speed difference signal 30 has a negative value. The speed control unit 31 performs an operation based on the speed difference signal 30 and the speed control unit 31 outputs the torque instruction signal 37 for deceleration, as can be seen from the torque instruction change line 54. That is, the speed control unit outputs the torque instruction signal 37 for applying a torque in the opposite rotation direction of the rotation direction of the rotating shaft 8b.

The position control unit 26 outputs the mode signal 49 indicating the change to the decelerated rotation to the limit value setting unit 46. The limit value setting unit 46 receives the mode signal 49 and recognizes the change to the decelerated rotation. As can be seen from the torque limit value change line 55, the limit value setting unit 46 raises the torque limit value to a decelerating limit value 55c. Accordingly, the torque limit control unit 38 changes the torque limit value to the torque instruction signal 37 indicated by the torque instruction change line 54 and outputs the torque instruction signal to the motor driving unit 44. As a result, as can be seen from the rotational speed change line 56, the rotating shaft 5a is decelerated.

When the rotating shaft 5a is in the decelerated rotation mode, the contact determining step of step S3 is performed. When the movable finger 8 comes in contact with the grasped object 10, the rotating shaft 5a cannot rotate and the rotational speed is 0 as can be seen from the rotational speed change line 56. The limit value setting unit 46 compares the rotational speed signal 29 with the contact determination speed 57. When the rotational speed signal 29 is lower than the contact determination speed 57, the limit value setting unit 46 determines that the movable finger 8 comes in contact with the grasped object 10. The limit value setting unit 46 outputs the limit torque setting signal 48 to the torque limit control unit 38 to raise the torque limit value to a grasping limit value 55d.

Subsequently, the pressing step of step S4 is performed. Since the movable finger 8 does not reach the movement destination 14 as can be seen from the finger change line 51 and the target finger change line 52, the position control unit 26 outputs the speed instruction 27 of a low-speed rotation as can be seen from the speed instruction change line 53. The speed control unit 31 outputs the torque instruction signal 37 for raising the torque to the torque limit control unit 38, as can be seen from the torque instruction change line 54, so as to raise the rotational speed of the rotating shaft 5a from 0 to the target rotational speed. Accordingly, the torque instruction signal 37 is raised to the grasping limit value 55d. The grasped object 10 is pressed with a pressure corresponding to the grasping limit value 55d.

In parallel with step S4, the torque determining step of step S5 is performed. The torque limit control unit 38 compares the torque instruction signal 37 with the grasping limit value 55d. When the torque instruction signal 37 reaches the grasping limit value 55d, step S6 is performed.

In the integration stop instructing step of step S6, the torque limit control unit 38 outputs the integration stop signal 43 to the integral control unit 33. The integral control unit 33 receives the integration stop signal 43 and stops the operation of integrating the speed difference signal 30. The torque limit control unit 38 also outputs the integration stop signal 43 to the unified control unit 16. The unified control unit 16 receives the integration stop signal 43 and recognizes that the robot hand 1 applies a predetermined pressure to the grasped object 10 and grasps the grasped object.

In the grasping step of step S7, the torque limit control unit 38 outputs the torque instruction signal 37 corresponding to the grasping limit value 55d to the motor driving unit 44 as can be seen from the torque instruction change line 54. As a result, the motor 5 outputs a high torque and presses the movable finger 8 to the grasped object 10. The robot hand 1 maintains the state where the grasped object 10 is grasped.

The unified control unit 16 drives the arm 3 and moves the grasped object 10 along with the robot hand 1. After the grasped object 10 moves to a prearranged position, the flow of processes goes to step S8.

In the separating and moving step of step S8, the same flow of processes as in the approaching and moving step of step S2 is performed to separate the movable finger 8 from the fixed finger 4 so as not to apply a pressure to the grasped object 10. First, the unified control unit 16 outputs the angle instruction 23 indicating the angle of the rotating shaft 5a corresponding to a new position of the movable finger 8 to the first adder 22. For example, as can be seen from the target finger change line 52, the target angle of the rotating shaft 5a is set to 0 degrees which is the angle in step S1. The first adder 22 outputs the operation angle signal 25, which is obtained by subtracting the angle data signal 24 from the angle instruction 23, to the position control unit 26. The position control unit 26 calculates the speed instruction 27 corresponding to the operation angle signal 25 and outputs the calculated speed instruction to the second adder 28. As can be seen from the speed instruction change line 53, the speed instruction 27 is set to a high speed in the direction in which the movable finger 8 is separated from the grasped object 10. The position control unit 26 outputs the mode signal 49 indicating the accelerated rotation mode to the limit value setting unit 46. The limit value setting unit 46 sets the accelerating limit value 55a which is the torque limit value in the accelerated rotation mode for the integral control unit 33. Accordingly, as can be seen from the torque limit value change line 55, the torque limit value of the integral control unit 33 is changed from the grasping limit value 55d to the accelerating limit value 55a.

The second adder 28 outputs the speed difference signal 30, which is obtained by subtracting the speed indicated by the rotational speed signal 29 from the speed instruction 27, to the speed control unit 31. The speed control unit 31 performs the PI control and outputs the torque instruction signal 37 corresponding to the speed difference signal 30. As can be seen from the torque instruction change line 54, the speed control unit 31 raises the torque instruction signal 37 to the accelerating limit value 55a. The torque instruction signal 37 is maintained as the accelerating limit value 55a.

Accordingly, as can be seen from the torque instruction change line 54, the torque instruction signal 37 of a high torque is output to the motor driving unit 44. The motor driving unit 44 drives the motor 5 to correspond to the torque instruction signal 37. As a result, as can be seen from the rotational speed change line 56, the rotating shaft 5a rotates in the direction in which the movable finger 8 is separated away from the grasped object 10 and the rotational speed thereof is raised.

The unified control unit 16 receives the rotational speed signal 29 and determines whether the rotation mode is the accelerated rotation or the constant-speed rotation. When the rotation mode is the constant-speed rotation, the unified control unit 16 outputs the torque limit signal 47 to the limit value setting unit 46. The limit value setting unit 46 receives the torque limit signal 47 and sets the torque limit value of the torque limit control unit 38 to the constant-speed-rotating limit value 55b as can be seen from the torque limit value change line 55.

When the movable finger 8 approaches a movement destination, the position control unit 26 lowers the speed indicated by the speed instruction 27 as can be seen from the speed instruction change line 53. The position control unit 26 outputs the mode signal 49 indicating the change to the decelerated rotation mode to the limit value setting unit 46. The limit value setting unit 46 receives the mode signal 49 and sets the torque limit value of the torque limit control unit 38 to the decelerating limit value 55c as can be seen from the torque limit value change line 55.

In order to reduce the rotational speed of the rotating shaft 5a indicated by the rotational speed signal 29 and to approach the speed instruction 27, the speed control unit 31 increases the torque of the torque instruction signal 37 as can be seen from the torque instruction change line 54. Accordingly, the rotational speed of the rotating shaft 5a decreases as can be seen from the rotational speed change line 56. When the movable finger 8 reaches the destination, the rotating shaft 5a stops.

The unified control unit 16 receives the angle data signal 24 and detects that the rotating shaft 5a stops. The unified control unit 16 outputs the torque limit signal 47 to the limit value setting unit 46. The limit value setting unit 46 outputs the limit torque setting signal 48 to the torque limit control unit 38 to change the torque limit value to a stop-time limit value 55e as can be seen from the torque limit value change line 55. The grasping operation of the robot hand is ended through the above-mentioned steps.

Figure 5:
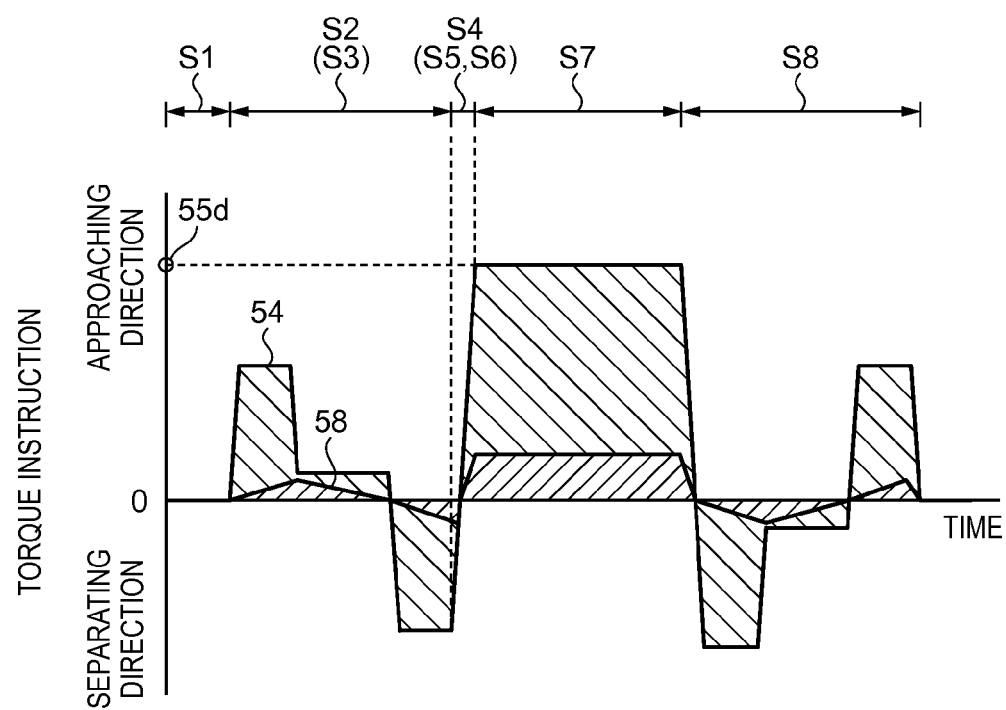
FIG. 5 is a timing diagram illustrating an output of an integration control unit.

FIG. 5 is a timing diagram illustrating the output of the integral control unit. The vertical axis and the horizontal axis of FIG. 5 are the same as in the timing diagram shown in FIG. 4C illustrating the torque instruction change line 54 and thus description thereof will not be repeated. In the torque instruction change line 54, the change of the second torque signal 36 output from the integral control unit 33 is defined as a torque instruction integration change line 58. In the approaching and moving step of step S2, the torque instruction integration change line 58 increases when the torque instruction change line 54 is changed to a high state. The torque instruction integration change line 58 decreases when the torque instruction change line 54 is changed to a low state.

In the grasping step of step S7, the torque instruction change line 54 increases until it reaches the grasping limit value 55d. After the torque instruction change line 54 reaches the grasping limit value 55d, the integration stop signal 43 is output from the torque limit control unit 38 to the integral control unit 33. Accordingly, the integral control unit 33 stops the integrating operation and the second torque signal 36 holds the output value, as can be seen from the torque instruction integration change line 58.

When the separating and moving step of step S8 is performed, the torque instruction integration change line 58 moves to correspond to the speed difference signal 30. Here, since the value of the second torque signal 36 is held in step S7, the speed control unit 31 can output the second torque signal 36 corresponding to the speed difference signal 30 with a high response property. Therefore, as can be seen from the torque instruction integration change line 58, the integral control unit 33 can output the second torque signal 36 with high precision.

Figure 6A:
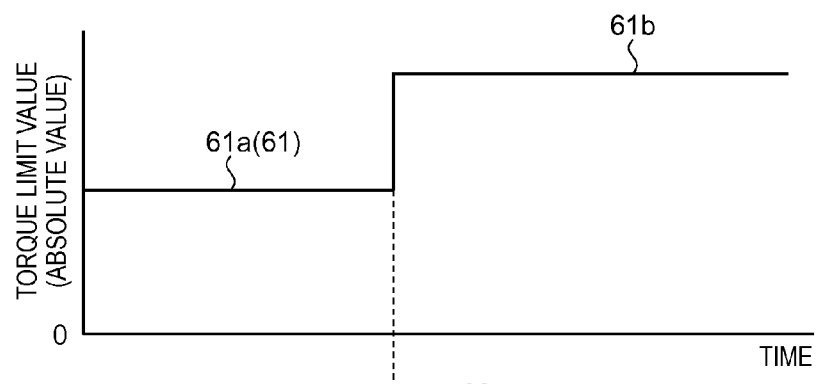
FIGS. 6A and 6B are timing diagrams illustrating a grasping method in the grasping operation.
Figure 6B:
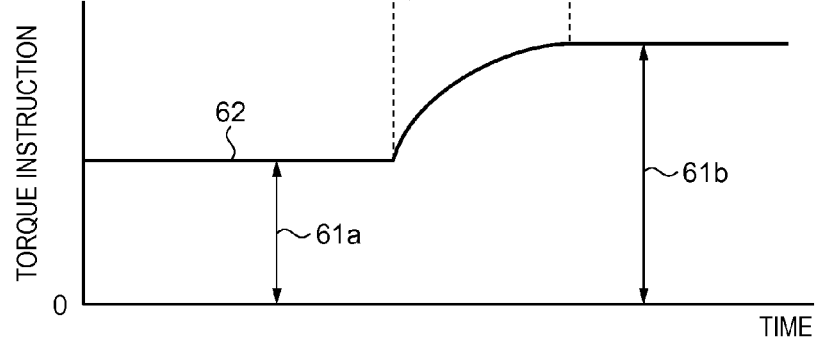

FIGS. 6A and 6B are timing diagrams illustrating the change of the torque instruction when the torque limit value is changed. The vertical axis and the horizontal axis of FIG. 6A are the same as in the timing diagram shown in FIG. 4D, the vertical axis and the horizontal axis of FIG. 6B are the same as in the timing diagram shown in FIG. 4C, and thus description thereof will not be repeated. In the torque limit value change line 61 shown in FIG. 6A, the torque limit value increases from a first torque limit value 61a to a second torque limit value 61b. The torque instruction change line 62 shown in FIG. 6B shows the change of the torque instruction signal 37 corresponding to the torque limit value change line 61.

When the torque limit value change line 61 is the first torque limit value 61a, the torque instruction change line 62 is the first torque limit value 61a. When the torque limit value change line 61 goes from the first torque limit value 61a to the second torque limit value 61b, the torque instruction change line 62 increases from the first torque limit value 61a to the second torque limit value 61b over a lapse time 62a.

Here, the lapse time 62a is greatly influenced by the feedback torque signal 39.

The torque instruction signal 37 is a signal obtained by adding the first torque signal 35 and the second torque signal 36 and subtracting the feedback torque signal 39 from the resultant. When the torque obtained by adding the first torque signal 35 and the second torque signal 36 is larger than the first torque limit value 61a, the torque corresponding to the larger part is the feedback torque signal 39. Therefore, when the feedback torque signal 39 is large, the lapse time 62a is short. When the feedback torque signal 39 is small, the lapse time 62a is long. That is, when the feedback torque signal 39 is small, the speed control unit 31 performs the PI control as can be seen from the torque instruction change line 62 and thus the torque instruction signal 37 can be slowly raised.

When it is determined in the contact determining step of step S3 that the rotating shaft 5a does not rotate, the limit value setting unit 46 raises the torque limit value from the decelerating limit value 55c to the grasping limit value 55d in the pressing step of step S4. At this time, since the torque instruction signal 37 is slowly raised, the grasped object 10 is slowly pressed. Accordingly, it is possible to prevent the grasped object 10 from being rapidly pressed in a damage.

As described above, this embodiment achieves the following advantages.

(1) According to this embodiment, the limit value setting unit 46 sets the torque limit value which is the maximum value of the torque applied to the rotating shaft 5a and outputs the set torque limit value to the torque limit control unit 38.

The torque limit control unit 38 compares the torque of the rotating shaft 5a driven by the torque instruction signal 37 with the torque limit value. When the torque of the rotating shaft 5a driven by the torque instruction signal 37 is about to become larger than the torque limit value, the torque limit control unit 38 changes the torque instruction signal 37 so that the torque of the rotating shaft 5a driven by the torque instruction signal 37 is not larger than the torque limit value.

Accordingly, even when the rotating shaft 5a rotates and stops, the motor control device 12 drives the rotating shaft 5a with a torque not greater than the torque limit value set by the limit value setting unit 46 while performing the speed control.

As a result, it is possible to control the rotational speed of the rotating shaft 5a with a torque corresponding to the torque required for the motor 5.

(2) According to this embodiment, when the torque applied to the rotating shaft 5a by the torque instruction signal 37 is about to become larger than the torque limit value, the torque limit control unit 38 subtracts the feedback torque signal 39 from the torque instruction signal 37 to change the torque instruction signal 37. The feedback torque signal 39 is a torque signal corresponding to the magnitude by which the torque applied to the rotating shaft 5a by the torque instruction signal 37 is larger than the torque limit value.

Therefore, it is possible to control the rotating shaft 5a so that the torque of the rotating shaft 5a driven by the subtracted torque instruction signal 37 is not larger than the torque limit value.

(3) According to this embodiment, the limit value setting unit receives the rotational speed signal 29. When the rotational speed of the rotating shaft 5a is lower than the contact determination speed 57, the limit value setting unit 46 changes the torque limit value. Therefore, the motor control device 12 can drive the rotating shaft 5a with a torque corresponding to the grasping limit value 55d in a state where the rotating shaft 5a rotates at a low speed or stops.

(4) According to this embodiment, the rotating shaft 5a is accelerated and its rotational speed is raised. After the rotational speed of the rotating shaft 5a reaches the target rotational speed indicated by the speed instruction 27, the limit value setting unit 46 lowers the torque limit value to the constant-speed-rotating limit value 55b. Since only the torque required for maintaining the rotational speed is applied after the rotational speed reaches the target rotational speed, the motor can be driven with a torque lower than that in the case where it is accelerated. Even when the torque limit value is lowered, it is possible to maintain the rotational speed.

When an external force which can stop the rotating shaft 5a is applied, the motor control device 12 can perform an operation complying with the external force without driving the rotating shaft 5a against the external force. Accordingly, even when an external force acts on the movable finger 8 due to a contact of the movable finger 8 with an object or the like, the movable finger 8 can fend off the external force. As a result, it is possible to suppress a damage of the movable finger 8 due to an external force.

(5) According to this embodiment, when the torque instruction signal 37 reaches the torque limit value, the torque limit control unit 38 causes the integral control unit 33 to stop the integrating operation. Therefore, it is possible to prevent the increase of the second torque signal 36. As a result, when the torque instruction signal is smaller than the torque limit value, it is possible to perform a control with an excellent response property to follow the rotational speed.

(6) According to this embodiment, the motor control device 12 performs a control so that the gap between the fixed finger 4 and the movable finger 8 is smaller than the width of the grasped object 10. The fixed finger 4 and the movable finger 8 pinch the grasped object 10 therebetween. After the fixed finger 4 and the movable finger 8 pinch the grasped object 10 therebetween, the torque of the rotating shaft 5a increases without decreasing. Therefore, the operation of pinching the grasped object 10 can be carried out subsequently to the operation of moving the fixed finger 4 and the movable finger 8.

When the movable finger 8 approaches the grasped object 10, the motor control device 12 increases the torque of the rotating shaft 5a to the torque limit value. At this time, since the torque of the rotating shaft 5a slowly increases, it is possible to prevent a force from rapidly being applied to the grasped object 10 to damage the grasped object. When the grasped object 10 departs from the area between the fixed finger 4 and the movable finger 8, the fixed finger 4 and the movable finger 8 stop in an area smaller than the width of the grasped object 10. Therefore, it is possible to prevent the fixed finger 4 and the movable finger 8 from colliding with each other.

Second Embodiment

Figure 7:
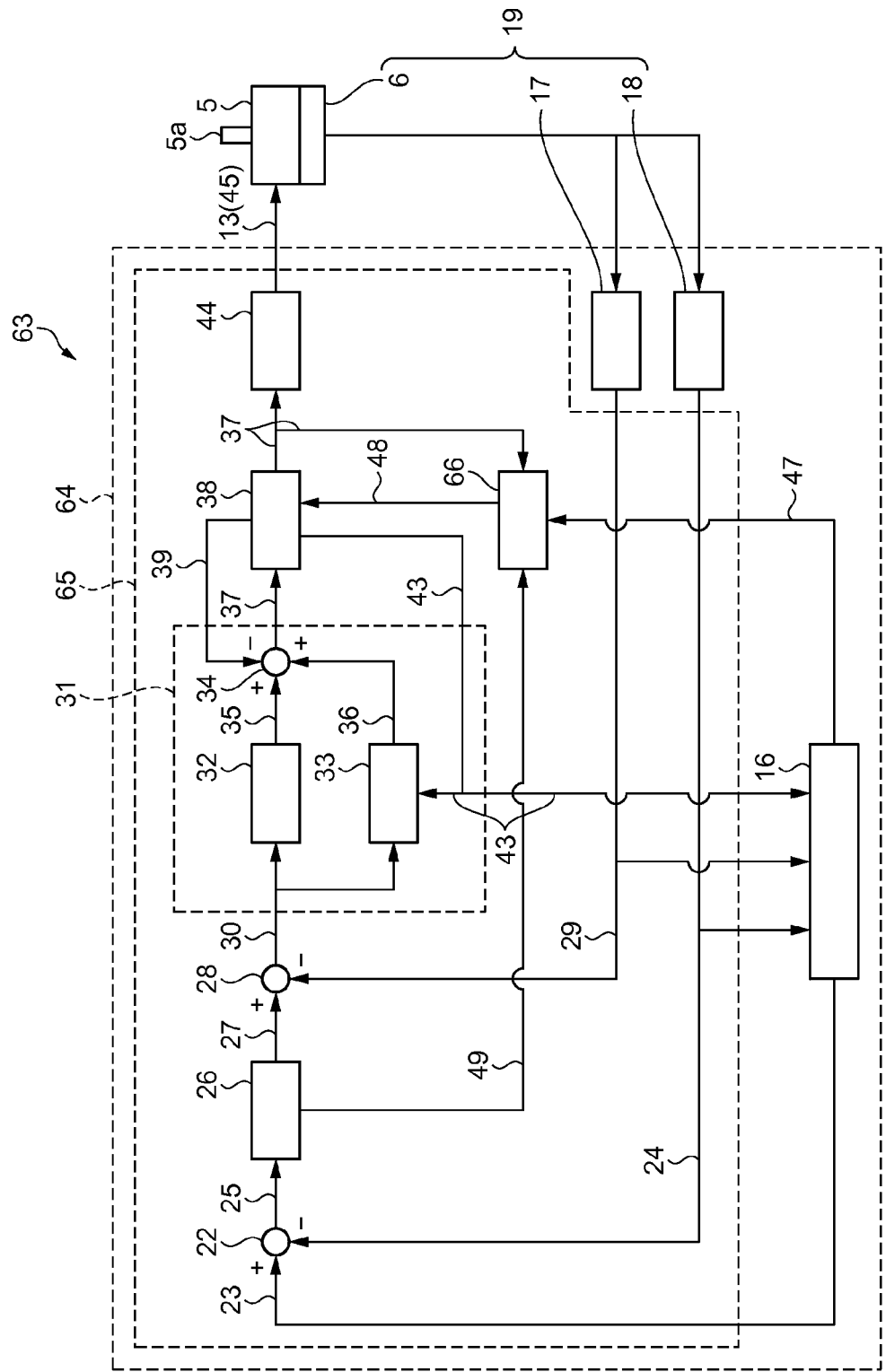
FIG. 7 is a block diagram illustrating the configuration of a control device according to a second embodiment of the invention.

A motor control device and a robot hand using the motor control device according to another embodiment of the invention will be described with reference to the block diagram of FIG. 7 illustrating the configuration of a control device and the timing diagram of FIGS. 4A to 4E illustrating the grasping method in the grasping operation. This embodiment is different from the first embodiment, in that the limit value setting unit determines whether the movable finger 8 comes in contact with a grasped object 10 using the torque instruction signal 37. The same details as in the first embodiment will not be repeatedly described.

That is, in this embodiment, as shown in FIG. 7, a robot hand 63 includes a control device 64 as a control unit and the control device 64 includes a motor control device 65. The motor control device 65 includes a limit value setting unit 66 corresponding to the limit value setting unit 46 of the first embodiment. Similarly to the limit value setting unit 46, the limit value setting unit 66 receives the mode signal 49 and the torque limit signal 47 and outputs the limit torque setting signal 48 to the torque limit control unit 38.

The limit value setting unit 66 receives the torque instruction signal 37. The limit value setting unit 66 determines whether the torque instruction signal 37 reaches the contact determination torque at the time of decelerated rotation. When the torque instruction signal 37 reaches the contact determination torque, the limit value setting unit 66 outputs the limit torque setting signal 48 to the torque limit control unit 38 to change the torque limit value.

As can be seen from the finger change line 51 of FIG. 4A, the position of the movable finger 8 approaches the movement destination 14 in the approaching and moving step of step S2. As can be seen from the speed instruction change line 53, the speed instruction 27 is changed to a low speed. As can be seen from the rotational speed change line 56, the rotational speed of the rotating shaft 5a decreases therewith. As can be seen from the rotational speed change line 56, the movable finger 8 comes in contact with the grasped object 10 and the rotational speed of the rotating shaft 5a becomes 0. On the other hand, as can be seen from the speed instruction change line 53, the speed instruction 27 is an instruction maintaining a positive speed. Accordingly, as can be seen from the torque instruction change line 54, the speed control unit 31 increases the torque signal indicated by the torque instruction signal 37 so that the rotational speed of the rotating shaft 5a approaches the speed instruction 27.

A contact instruction speed 67 and a contact determination torque 68 are set in advance in the limit value setting unit 66. The contact instruction speed 67 is a determination value used to determine whether it is in a contact mode. The contact determination torque 68 is a determination value used to determine whether a contact or not.

First, the limit value setting unit 66 determines whether the speed instruction 27 is lower than the contact instruction speed 67. Then, when the speed instruction 27 is lower than the contact instruction speed 67, the limit value setting unit 66 recognizes the mode in which the rotating shaft 5a rotates at a low speed to bring the movable finger 8 into contact with the grasped object 10. Subsequently, the limit value setting unit 66 compares the torque indicated by the torque instruction signal 37 with the contact determination torque 68. When the torque indicated by the torque instruction signal 37 increases and reaches the contact determination torque 68, the limit value setting unit 66 determines that the movable finger 8 comes in contact with the grasped object 10. Then, as can be seen from the torque limit value change line 55, the limit value setting unit 66 switches the torque limit value from the decelerating limit value 55c to the grasping limit value 55d.

As described above, this embodiment provides the following advantages.

(1) According to this embodiment, the limit value setting unit receives the torque instruction signal 37. When the rotational speed of the rotating shaft 5a becomes smaller than the speed instruction 27 and the difference therebetween becomes larger, the torque instruction signal 37 is output as a signal for increasing the torque of the rotating shaft 5a.

That is, the limit value setting unit 66 can detect that the rotating shaft 5a rotates at a low speed or stops using the torque instruction signal 37. The limit value setting unit 66 changes the torque limit value when the torque instruction signal 37 reaches the contact determination torque 68.

Therefore, the motor control device 65 can determine whether the rotating shaft 5a stops and can drive the rotating shaft 5a with a torque corresponding to the grasping limit value 55d.

Third Embodiment

Figure 8A:
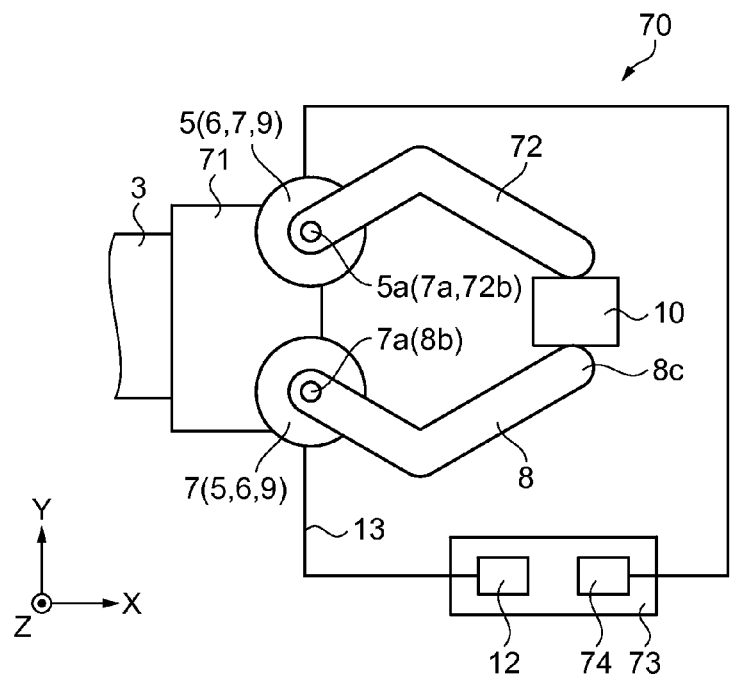
FIG. 8A is a plan view schematically illustrating the configuration of a robot hand according to a third embodiment of the invention and FIG. 8B is a partially-enlarged view schematically illustrating fingers of the robot hand.
Figure 8B:
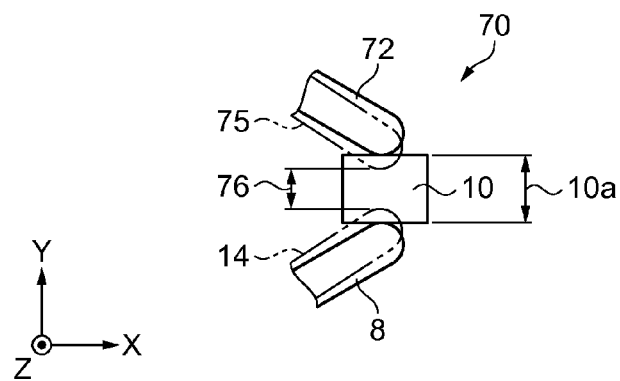
Figure 9:
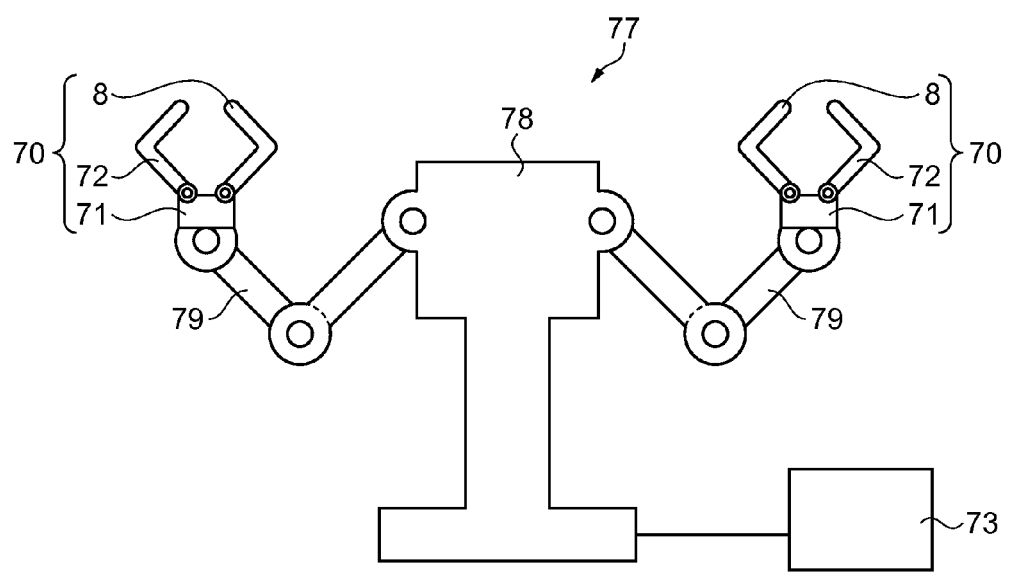
FIG. 9 is a plan view schematically illustrating the configuration of a robot having a robot hand.

A robot hand according to another embodiment of the invention and a robot having the robot hand will be described below with reference to FIGS. 8A and 8B and FIG. 9. FIG. 8A is a plan view schematically illustrating the configuration of a robot hand and FIG. 8B is a partially-enlarged view schematically illustrating fingers of the robot hand. FIG. 9 is a plan view schematically illustrating the configuration of a robot having the robot hand. This embodiment is different from the first embodiment, in that plural movable fingers pinch a grasped object. The same points as in the first embodiment will not be described.

That is, according to the third embodiment, as shown in FIG. 8A, the robot hand 70 includes a hand body 71 of a rectangular parallelepiped shape. The longitudinal direction of the hand body 71 is defined as a Y direction and a direction perpendicular to the Y direction is defined as an X direction.

The thickness direction of the hand body 71 perpendicular to the X direction and the Y direction is defined as a Z direction. On the -X side of the hand body 71, the hand body 71 is connected to an arm 3 and the arm 3 is connected to a robot body not shown in the drawing. Similarly to the first embodiment, a motor 5, an encoder 6, a reduction gear 7, a movable finger 8, and a bearing 9 are disposed at the corner in the X direction and the -Y direction of the hand body 71. The movable finger 8 is made to rotate by the motor 5. Similarly to the movable finger 8, a motor 5, an encoder 6, a reduction gear 7, a movable finger 72 as the movable part and the second movable part, and a bearing 9 are disposed at the corner in the X direction and the −Y direction of the hand body 71. The movable finger 72 is made to rotate by the motor 5.

The movable finger 8 and the movable finger 72 are symmetric in the XY plane and a grasped object 10 can be pinched and held with the movable finger 8 and the movable finger 72. The robot hand 70 includes a control device 73 and the control device 73 includes a motor control device 12 controlling the motor 5 driving the movable finger 8 and a motor control device 74 controlling the motor 5 driving the movable finger 72. The motor control device 12 and the motor control device 74 are the same device as the motor control device 12 according to the first embodiment.

As shown in FIG. 8B, the robot hand 70 pinches and grasps a grasped object 10 with the movable finger 8 and the movable finger 72. The width of the grasped object 10 in the direction passing through the positions at which the movable finger 8 and the movable finger 72 come in contact with the grasped object 10 is defined as a grasped object width 10a. When the robot hand 70 grasps the grasped object 10, the movable finger 8 is made to move to a movement destination 14 indicated by a two-dot chained line in the drawing. The movable finger 72 is made to move to a movement destination 75 indicated by a two-dot chained line in the drawing. The control device 73 causes the motor control devices 12 and 74 to drive the motors 5 so as to move the movable finger 8 to the movement destination 14 and to move the movable finger 72 to the movement destination 75.

The gap between the movement destination 14 of the movable finger 8 and the movement destination 75 of the movable finger 72 is defined as a target gap 76. Here, the target gap 76 is smaller than the grasped object width 10a. Accordingly, the movable finger 8 and the movable finger 72 come in contact with the grasped object 10 before the movable finger 8 reaches the movement destination 14 and the movable finger 72 reaches the movement destination 75. Therefore, the grasped object 10 can be pressed and grasped with the movable finger 8 and the movable finger 72 until the control device 73 changes the instruction of the motor control device 12 and the motor control device 74 to drive the motor 5.

When the movable finger 8 and the movable finger 72 are keeping the grasped object 10, an external force may act on the grasped object 10 and the grasped object 10 may depart from the area between the movable finger 8 and the movable finger 72. At this time, since the movable finger 8 and the movable finger 72 move to the movement destination 14 and the movement destination 75 and stop therein, it is possible to prevent the movable finger 8 and the movable finger 72 from colliding with each other in a damage.

As shown in FIG. 9, a robot 77 includes a body 78 and two arms 79 are connected to the body 78. Each arm 79 includes the robot hand 70. Here, the arm 79 may include the robot hand 1 described in the first embodiment. The robot 77 includes a control device 73 controlling the robot hand 70 and the arms 79. Therefore, the control device 73 can control the torques while controlling the speeds of the motor 5 driving the movable finger 8 and the movable finger 72.

As described above, this embodiment provides the following advantages.

(1) According to this embodiment, the motor control device 12 controlling the movable finger 8 and the motor control device 74 controlling the movable finger 72 are constructed by the same motor control device as in the first embodiment.

Therefore, even when the rotating shafts 5a are rotating and when the rotating shafts stop, it is possible to drive the rotating shafts 5a with torques corresponding to the torques required for the motors 5. As a result, even when the movable finger 8 or the movable finger 72 moves and stops, it is possible to hold a predetermined force and to drive the movable finger 8 and the movable finger 72.

(2) According to this embodiment, since the movable finger 8 and the movable finger 72 move to the movement destination 14 and the movement destination 75 and stop therein, it is possible to prevent the movable finger 8 and the movable finger 72 from colliding with each other in a damage.

(3) According to this embodiment, the robot 77 includes the robot hand 70. Accordingly, even when the movable finger 8 and the movable finger 72 move and stop, the robot hand 70 of the robot 77 can hold a predetermined force and drive the movable finger 8 and the movable finger 72.

The invention is not limited to the above-mentioned embodiments, but may be modified and changed in various forms. Modified examples will be described below.

MODIFIED EXAMPLE 1

In the first embodiment, the speed detecting unit 17 and the angle detecting unit 18 are included in the control device 11.

The speed detecting unit 17 and the angle detecting unit 18 may not be included in the control device 11. They may be provided in the form of independent devices. In this case, it is possible to more easily manufacture the robot hand 1.

MODIFIED EXAMPLE 2

In the first embodiment, the angle data signal 24 and the rotational speed signal 29 are formed through the use of the encoder 6. A resolver or a gyroscope may be used instead of the encoder 6. By employing a method of easily manufacturing a sensor detecting the rotation state, it is possible to facilitate the manufacturing of the motor control device 12.

MODIFIED EXAMPLE 3

In the first embodiment, in the approaching and moving step of step S2, the unified control unit 16 determines the change to constant-speed rotation and outputs the torque limit signal 47 indicating the change to a constant-speed rotation mode to the limit value setting unit 46. The function of determining the change to a constant-speed rotation mode may be performed by the limit value setting unit 46. In this case, similarly to the first embodiment, the torque limit value can be lowered.

The load of the unified control unit 16 can be reduced.

MODIFIED EXAMPLE 4

In the third embodiment, the control device 73 includes the motor control device 12 according to the first embodiment, but may include the motor control device 65 according to the second embodiment. In this case, it is possible to perform the torque control while performing the speed control.

MODIFIED EXAMPLE 5

In the third embodiment, two movable fingers of the movable finger 8 and the movable finger 72 are disposed in the robot hand 70. However, the number of movable fingers is not limited to two, but may be three or more. In this case, by employing the method according to the first or second embodiment for the control of the motors driving the movable fingers, it is possible to grasp the grasped object 10 well.

The entire disclosure of Japanese Patent Application No. 2011-223655, filed Oct. 11, 2011, is expressly incorporated by reference herein.

What is claimed is:

1. A motor control method of controlling the rotation of a rotating shaft of a motor, comprising:
   setting a target rotational speed which is a target value of a rotational speed at which the rotating shaft rotates and a torque limit value which indicates the maximum value of a torque to be applied to the rotating shaft;
   detecting the rotational speed to output a torque instruction signal corresponding to a difference between the rotational speed and the target rotational speed;
   subtracting an excess torque signal, which is a signal indicating a magnitude by which the torque applied to the rotating shaft by the torque instruction signal is larger than the torque limit value, from the torque instruction signal;
   changing the torque limit value when the rotational speed of the rotating shaft is lower than a speed determination value; and
   driving the motor with a torque of the torque instruction signal.

2. A motor control device that controls a motor using a rotation detection signal of a rotating shaft of the motor output from a rotation detector detecting a rotation state of the rotating shaft of the motor, the motor control device comprising:
   a power transistor that drives the motor;
   a speed controller configured to output a torque instruction signal corresponding to a difference between a rotational speed of the rotating shaft and a target rotational speed of the rotating shaft using the target rotational speed of the rotating shaft and the rotation detection signal; and
   a torque limit control unit configured to limit the torque of the rotating shaft driven by the torque instruction signal to a torque limit value or less, wherein:
   the torque limit value is changed when the rotational speed of the rotating shaft is lower than a speed determination value that is used to determine whether to change the torque limit value.

3. The motor control device according to claim 2, wherein the torque limit control unit subtracts an excess torque signal, which is a signal indicating a magnitude by which the torque applied to the rotating shaft by the torque instruction signal is larger than the torque limit value, from the torque instruction signal.

4. The motor control device according to claim 2 further comprising:
a limit value setting unit configured to set the torque limit value indicating the maximum value of a torque to be applied to the rotating shaft, wherein:
the limit value setting unit sets the speed determination value,
the limit value setting unit detects the rotational speed of the rotating shaft using the rotation detection signal, and
the limit value setting unit changes the torque limit value when the rotational speed of the rotating shaft is lower than the speed determination value.

5. The motor control device according to claim 2 further comprising:
a limit value setting unit configured to set the torque limit value indicating the maximum value of a torque to be applied to the rotating shaft, wherein:
the limit value setting unit sets the speed determination value,
the limit value setting unit receives the torque instruction signal, and
the limit value setting unit changes the torque limit value when the target rotational speed is smaller than the speed determination value and the torque instruction signal is larger than a torque determination value.

6. The motor control device according to claim 2 further comprising:
a limit value setting unit configured to set the torque limit value indicating the maximum value of a torque to be applied to the rotating shaft, wherein the limit value setting unit lowers the torque limit value after the rotational speed of the rotating shaft reaches the target rotational speed.

7. The motor control device according to claim 2, wherein the speed controller includes:
a speed-proportional control unit configured to output a first torque instruction signal proportional to the rotational speed;
a speed-integral control unit configured to output a second torque instruction signal proportional to an integrated value of the rotational speed; and
an adder adding the value of the first torque instruction signal and the value of the second torque instruction signal to output the torque instruction signal, and
wherein the torque limit control unit causes the speed-integral control unit to stop an integrating operation and to maintain the value of the second torque instruction signal after the value of the torque instruction signal reaches the torque limit value.

8. The motor control device according to claim 2, wherein the rotation state of the rotating shaft detected by the rotation detector is a rotational speed.

9. A robot comprising:
a robot hand that includes a moveable part and a motor that drives the moveable part; and
a control unit that includes a motor control device that controls the motor using a rotation detection signal of a rotating shaft of the motor output from a rotation detector detecting a rotation state of the rotating shaft of the motor, the motor control device comprising:
a power transistor that drives the motor;
a speed controller configured to output a torque instruction signal corresponding to a difference between a rotational speed of the rotating shaft and a target rotational speed of the rotating shaft using the target rotational speed of the rotating shaft and the rotation detection signal; and
a torque limit control unit configured to limit the torque of the rotating shaft driven by the torque instruction signal to a torque limit value or less, wherein:
the torque limit value is changed when the rotational speed of the rotating shaft is lower than a speed determination value that is used to determine whether to change the torque limit value.

* * * * *